(12) United States Patent
Wehrenberg (10) Patent No.: US 8,650,584 B2
(45) Date of Patent: Feb. 11, 2014

(54) DISC MOUNTING IN OPTICAL DISC DRIVES

(75) Inventor: Paul J. Wehrenberg, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 800 days.

(21) Appl. No.: 12/841,902

(22) Filed: Jul. 22, 2010

(65) Prior Publication Data

US 2011/0258649 A1    Oct. 20, 2011

Related U.S. Application Data

(60) Provisional application No. 61/325,308, filed on Apr. 17, 2010.

(51) Int. Cl.
*G11B 7/085* (2006.01)

(52) U.S. Cl.
USPC ............................................. 720/697

(58) Field of Classification Search
USPC ............................................. 720/697
See application file for complete search history.

(56) References Cited

U.S. PATENT DOCUMENTS

| | | | |
|---|---|---|---|
| 6,680,896 B2 | 1/2004 | Shiwa | |
| 6,910,218 B2 | 6/2005 | Park et al. | |
| 7,243,358 B2 * | 7/2007 | Bae | 720/652 |
| 7,346,915 B2 * | 3/2008 | Te et al. | 720/664 |
| 7,610,593 B2 | 10/2009 | Onuma et al. | |
| 8,424,032 B2 * | 4/2013 | Yoon | 720/707 |

* cited by examiner

*Primary Examiner* — Mark Blouin
(74) *Attorney, Agent, or Firm* — Womble Carlyle Sandridge & Rice LLP (57) ABSTRACT

The embodiments herein describe an apparatus and method for a reduced Z stack slot loading optical disc drive (ODD). In one embodiment a reduced Z stack height slot loading optical disc drive (ODD) is described. The reduced Z stack height ODD includes at least a hub/turntable arrangement having a hub portion and a turntable portion, the turntable portion arranged to support an optical disc secured thereto by way of the hub such that when a rotational motive force is applied to the hub/combination, the optical disc rotates about a hub/turntable axis of rotation, and a rotational motor adjacent to the hub/turntable arrangement, the rotational motor being arranged to provide the rotational motive force to the hub/turntable arrangement, the rotational motor being located in such a way that a rotational motor axis of rotation is translated in a direction perpendicular to the hub/turntable axis of rotation and wherein a Z height of the hub/turntable arrangement and a Z height of the rotational motor are not cumulative.

20 Claims, 7 Drawing Sheets

DISC MOUNTING IN OPTICAL DISC DRIVES

CROSS REFERENCE TO RELATED APPLICATIONS

This application claims priority under 35 USC 119(e) to U.S. Provisional Patent Application No. 61/325,308, filed Apr. 17, 2010 and is incorporated herein by reference in its entirety for all purposes.

TECHNICAL FIELD

The described embodiments relate generally to optical disc drives (ODD) and more particularly to reducing an overall Z stack of a slot driven ODD.

BACKGROUND OF THE INVENTION

In many cases it is necessary to mount objects onto a turntable. For example, many electronic devices contain an optical disc drive (ODD) for the purpose of reading and writing optical discs. Especially in the design of portable computers and electronic devices, there is a high value placed on reduction of size and weight. In current practice the slot loading ODD contains a coaxial hub/turntable/rotation motor combination that moves substantially along the axis of rotation, the 'z' direction, during the process of chucking the optical disc on the hub and turntable. Initially the hub/turntable/rotation motor combination must be moved substantially along the z direction so as to not interfere with movement of the optical disc in the plane of insertion, which plane of insertion is perpendicular to the z direction. When the optical disc is inserted, the hub/turntable/rotation motor combination is driven substantially along z in the other direction, so that the chucking hub is forced into the center hole of the optical disc, and thereby the optical disc is secured to the hub/turntable/rotation motor combination.

Unfortunately, however, this motion in the z direction increases the overall height, also referred to as the Z stack height, of the ODD. This increase in Z stack height can limit any reduction in size or weight of the portable computer.

Therefore, what is desired is a reduced Z stack optical disc drive.

SUMMARY OF THE DESCRIBED EMBODIMENTS

In one embodiment a reduced Z stack height slot loading optical disc drive (ODD) is described. The reduced Z stack height ODD includes at least a hub/turntable arrangement having a hub portion and a turntable portion, the turntable portion arranged to support an optical disc secured thereto by way of the hub such that when a rotational motive force is applied to the hub/combination, the optical disc rotates about a hub/turntable axis of rotation. The ODD also includes at least a rotational motor adjacent to the hub/turntable arrangement, the rotational motor being arranged to provide the rotational motive force to the hub/turntable arrangement, the rotational motor being located in such a way that a rotational motor axis of rotation is translated in a direction perpendicular to the hub/turntable axis of rotation and wherein a Z height of the hub/turntable arrangement and a Z height of the rotational motor are not cumulative.

A method of mounting and rotating an optical disc on the hub/turntable arrangement of an ODD can be carried out by performing at least the following operations. Securing the optical disc to the hub/turntable arrangement, operationally configuring the hub/turntable arrangement with a rotation motor that is adjacent to and removed from an axis of rotation of the hub/turntable arrangement, and driving the rotation movement of the hub/turntable arrangement using the adjacent rotation motor.

A non-transitory computer readable medium for storing a computer program, the computer program executed by a processor for controlling the operation of an ODD includes at least computer code for detecting the presence of the optical disc being substantially centered around the center of the hub/turntable arrangement, computer code for generating a hub/turntable arrangement upward displacement signal in response to the presence of the optical disc being substantially centered around the center of the hub/turntable arrangement, computer code for sending the hub/turntable upward displacement signal to the hub/turntable control arrangement, computer code for detecting the presence of the optical disc being secured to the turntable, computer code for generating a hub/turntable arrangement downward displacement signal in response to the presence of the optical disc being secured to the turntable, and computer code for sending the hub/turntable arrangement downward displacement signal to the hub/turntable control arrangement.

Other aspects and advantages will become apparent from the following detailed description taken in conjunction with the accompanying drawings which illustrate, by way of example, the principles of the invention.

BRIEF DESCRIPTION OF THE DRAWINGS

The invention and the advantages thereof may best be understood by reference to the following description taken in conjunction with the accompanying drawings.

FIG. 13: The line designator for element 1304 has been replaced by an arrow, and the line designator for element 204 has been slightly displaced down.

FIG. 14: Label 1304 and an arrow designator have been added in correspondence with FIG. 13. Original label 1304 has been replaced with label 204.

FIG. 15: Label 1304 and its designator line have been removed. Label 1304 and an arrow designator line have been added. Labels 202 and 204 and corresponding designator lines have been added.

DETAILED DESCRIPTION OF REPRESENTATIVE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Broadly speaking, the embodiments herein describe an apparatus and method for a reduced Z stack slot loading optical disc drive (ODD). The various embodiments describe a reduced Z stack optical disc drive having at least a dual axis combination of a hub assembly, a turntable, and a rotation motor where the movement of these elements can be arranged to chuck and un-chuck an optical disc and provide rotation of the secured optical disc in a reduced Z stack environment. The various processes described can be performed by a processor executing a computer program product stored in a memory device along the lines of a system memory, for example, that can take the form of a hard disc drive, semiconductor memory such as FLASH, and so on. The computer program product can be part of a system program such a firmware that can be periodically accessed and updated when necessary.

More specifically, a rotation motor can be removed from the Z stack of the hub assembly and translated to a position adjacent to the hub assembly perpendicular to an axis of rotation of the turntable. In the described embodiments, the rotation motor can impart a rotational motive force to the adjacent turntable in motive contact with the rotation motor. Since the rotation motor is removed from the Z stack of the hub assembly, the overall Z height of the optical disc drive can be reduced by at least an amount equal to the nominal Z height of the rotation motor (which can be on the order of about 2 mm). In order to receive an optical disc at a receiving slot of the optical disc drive, a clear path is provided for the insertion of the optical disc since the hub assembly is located downward (i.e., −z direction) in relation to the turntable. When the optical disc is substantially centered about a turntable central opening, the hub assembly moves upward (i.e., +z direction) in such a way as to engage (i.e., chuck) a central hole of the optical disc. Once the optical disc is securely chucked to the turntable, the rotational motor can impart a rotational motive force to the turntable. Since the rotational motor is not included in the Z stack of the hub assembly, the overall thickness of the slot loading ODD can be substantially reduced over conventional slot loading optical disc drives allowing for the design of slimmer and more portable computers and electronic devices.

These and other embodiments are discussed below with reference to FIGS. 1-15. However, those skilled in the art will readily appreciate that the detailed description given herein with respect to these figures is for explanatory purposes only and should not be construed as limiting.

Figure 1:
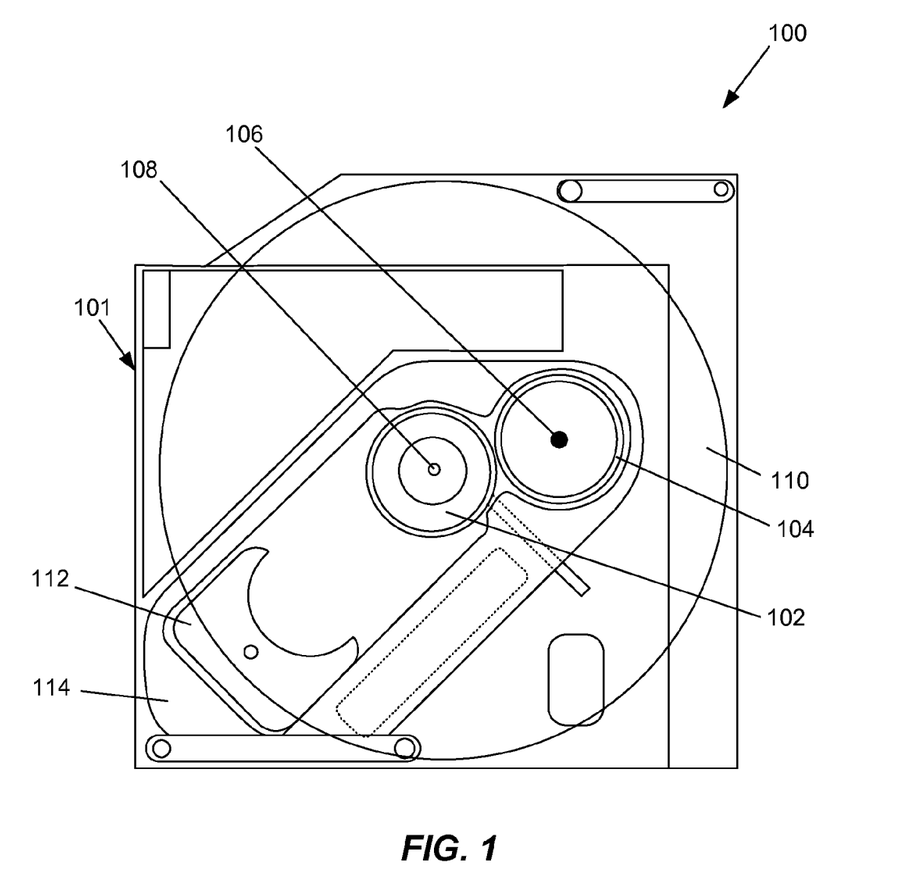
FIG. 1 shows a plan view of a slot loading optical disc drive (ODD) assembly having hub/turntable combination with an adjacent rotation motor having an axis of rotation is displaced from the axis of rotation of hub/turntable combination.
Figure 2:
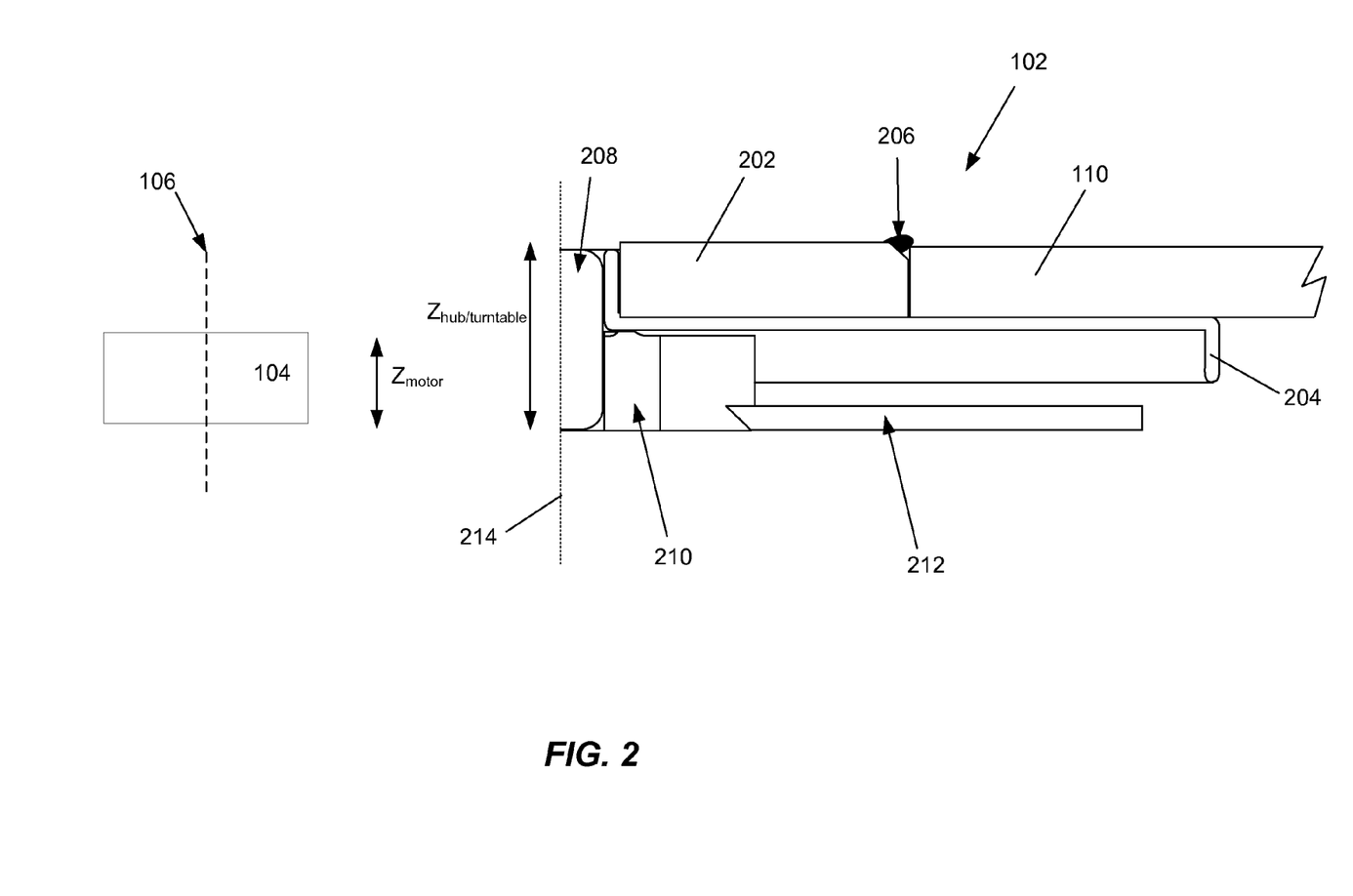
FIG. 2 shows a cross section view of hub and turntable on which is mounted optical disc.

FIG. 1 shows a plan view of slot loading optical disc drive (ODD) assembly 100 in accordance with the described embodiments. ODD assembly 100 can include at least chassis 101 used to enclose and support hub/turntable combination 102 and adjacent rotation motor 104 having axis of rotation 106 displaced from axis of rotation 108 of hub/turntable combination 102. Also shown for context are optical disc 110, optical pickup unit 112 arranged to read digital data optically encoded on optical disc 110. Frame 114 can support optical pickup unit 112, hub/turntable combination 102 and rotation motor 104. Optical disc 110 can be inserted into ODD assembly 100 by way of a slot opening (not shown). Optical disc 110 can be secured (also referred to as chucked) to hub/turntable combination 102 as illustrated in FIG. 2 showing a cross section view of a particular embodiment of hub/turntable combination 102 with hub 202 and turntable 204 on which optical disc 110 is secured by clamp 206. Turntable 204 can rotate about shaft 208 and bushing (or bearing) 210 mounted on base 212. Axis of rotation 106 of rotation motor 104 is translated in a direction perpendicular to axis of rotation 214 of the optical disc 110 (that coincides with axis of rotation of hub/turntable combination 202/204). Accordingly, height $Z_{motor}$ required for rotation motor 104 and height $Z_{hub/turntable}$ required for the hub/turntable combination 202/204 are not added together in contrast to a conventional hub/turntable/rotation motor combination where the rotation motor and hub/turntable are stacked one atop the other. Accordingly, the overall Z height of the conventional ODD is that of the Z stack heights of the coincidentally placed rotation motor and hub/turntable combination added together. However, by displacing axis of rotation 106 of rotation motor 104 from axis of rotation 212 of hub/turntable combination 202/204, a substantial reduction in the overall Z height can be achieved. For example, the reduction in Z stack height from conventional ODD arrangements can be on the order of height $Z_{motor}$ of rotation motor 104.

Figure 3:
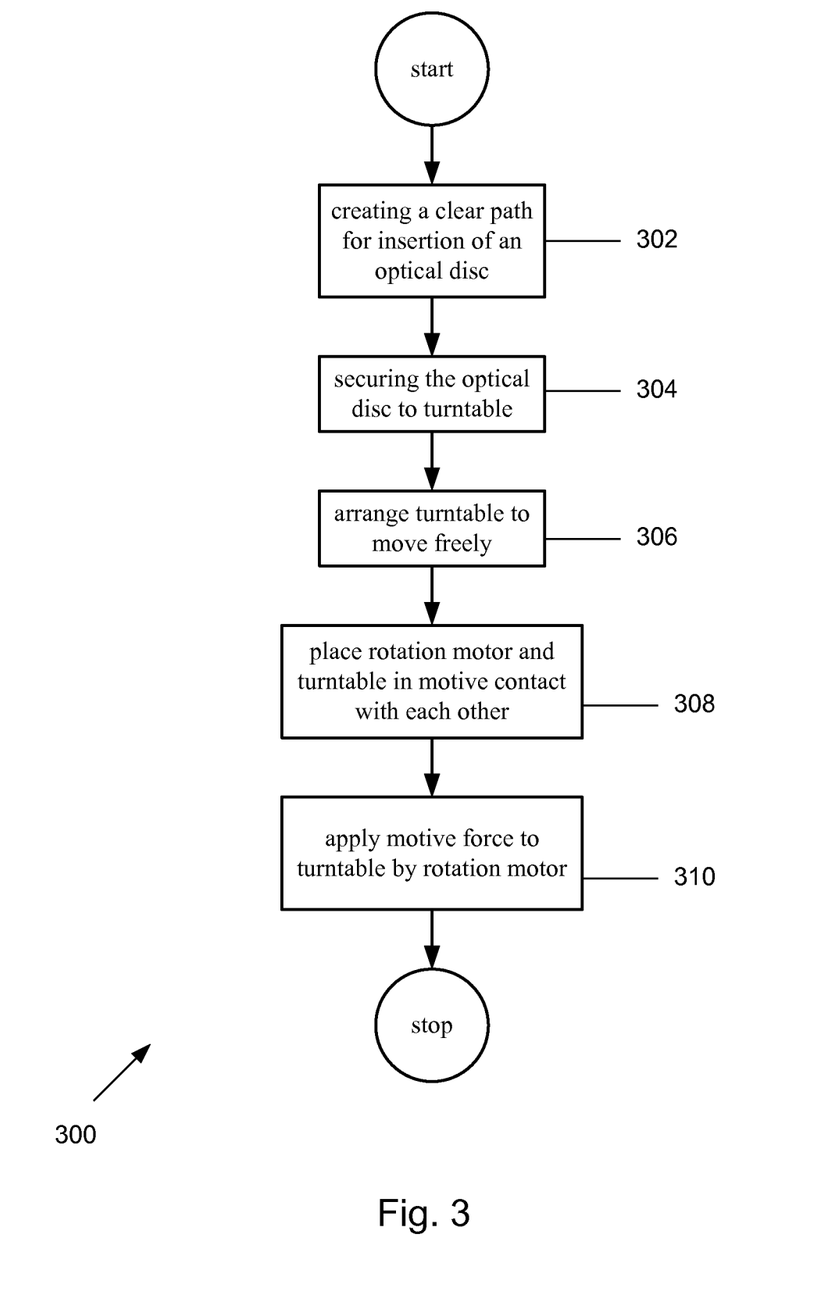
FIG. 3 shows a flowchart detailing a process in accordance with the described embodiments.

Additional configurations of reduced Z stack optical disc drives are shown in the following figures. The reduced Z stack optical disc drives described rely upon a lateral translation of axes of rotation of a rotation motor and hub/turntable combination to reduce the overall Z stack height of the optical disc drive. FIG. 3 shows a flowchart detailing process 300 for operating a reduced Z height optical disc drive in accordance with the described embodiments. Process 300 can be performed by creating a clear path for insertion of an optical disc at 302. The clear path can be created by, for example, retracting a hub/clamp into a recess of the hub/turntable combination thereby removing any impediments to the insertion of the optical disc into the optical disc drive. Once inserted and properly placed on the turntable, at least a portion of the hub centers the optical disc by forcing the hub into a center hole of the optical disc. The centered optical disc is then chucked (i.e., secured) to the hub/turntable combination by way of, for example, clamps in cooperation with the hub at 304. Once the optical disc is chucked, the optical disc/hub/turntable combination is arranged to rotate freely at 306. At 308, the optical disc/hub/turntable combination and a rotation motor each having axes of rotation laterally displaced from one another are placed in motive contact with each other. In one embodiment, the motive contact can take the form of a belt. In another embodiment the motive contact can take the form of surfaces having high coefficients of friction or gear like structures. Other forms of motive contact are described in some detail in the following figures. At 310, the rotation motor applies a motive force to the optical disc/hub/turntable combination. More particularly, the motive force is applied to a portion of the turntable which then causes the hub and optical disc to move in accordance with the turntable.

Several further embodiments are disclosed below with regards to FIGS. 4-15.

Figure 4:
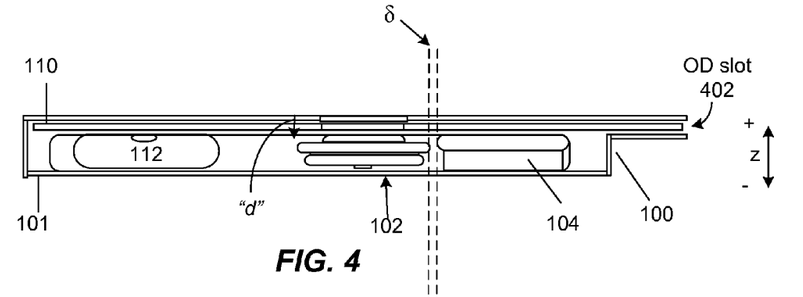
FIGS. 4-6 describe an embodiment in which both the turntable/hub combination and the rotation motor move with respect to the ODD chassis.
Figures 5, 6:
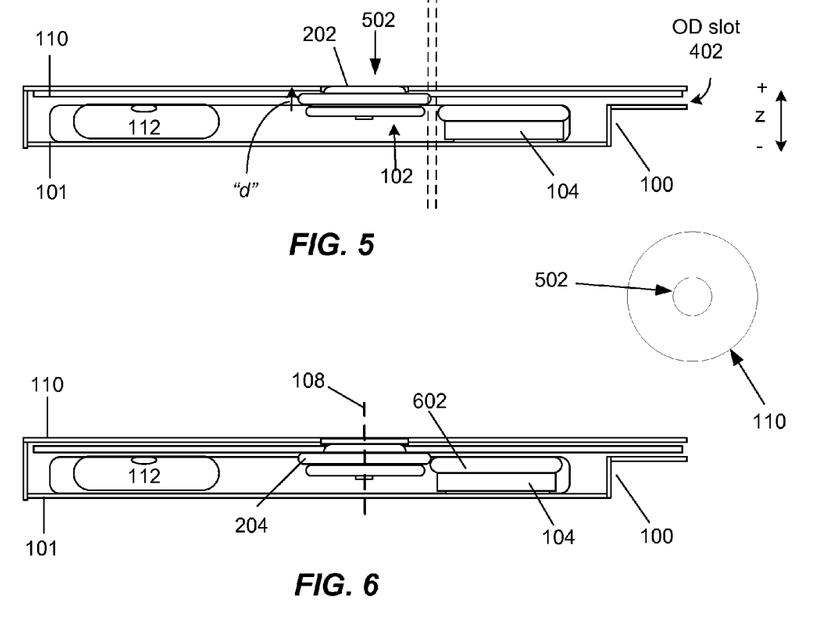

FIGS. 4-6 describe an embodiment in which both turntable/hub combination 102 and the rotation motor 104 move with respect to the ODD chassis 101. In FIG. 4 hub/turntable combination 102 can move downward (−) in the z direction about distance "d" to clear a path to allow insertion of the optical disc 110 into ODD 100 by way of OD slot 402. In FIG. 5 hub/turntable combination 102 can move upward (+) in the z direction about distance "d" to force the hub 202 into the center hole 502 of the optical disc 110. In FIG. 6, hub/turntable combination 102 can be arranged to freely rotate about axis of rotation 108 and rotation motor 104 can move about distance δ such that that driving rim 602 of rotation motor 104 is in contact with the turntable 204. In this way, a motive force can be applied to directly to turntable 204 by way of driving rim 602.

Figure 7:
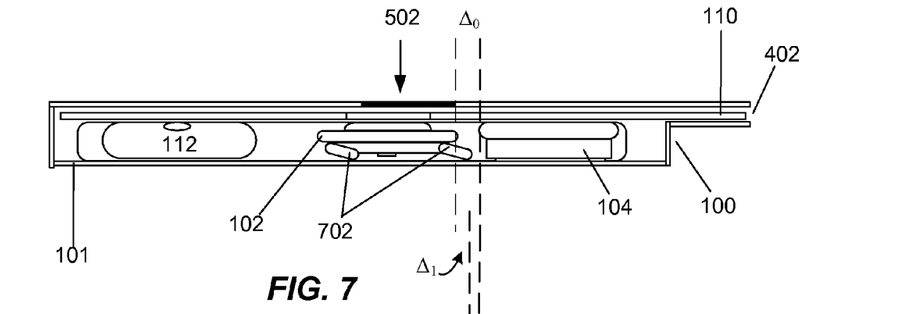
FIGS. 7-9 describe an embodiment in which the turntable/hub combination moves substantially in two dimensions and the rotation motor is fixed with respect to the ODD chassis.
Figure 8:
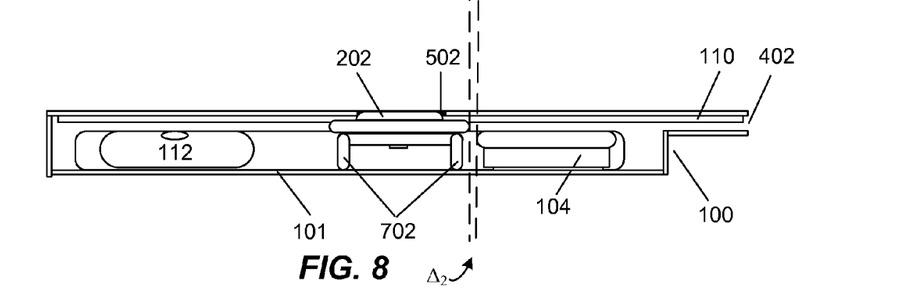
Figure 9:
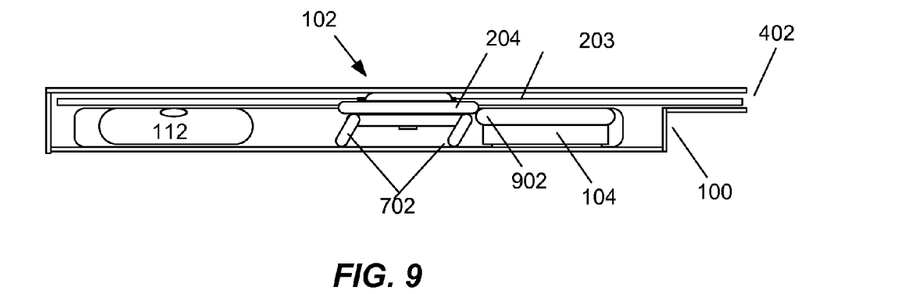

FIGS. 7-9 describe an embodiment in which turntable/hub combination 102 can be pivotally attached to chassis 101 by way of supports 702. In this way, turntable/hub combination 102 can move in two dimensions with respect to ODD chassis 102 whereas rotation motor 104 can remain fixed with respect to the ODD chassis 101. In FIG. 7, pivot supports 702 can be used to cause hub/turntable combination 102 to pivot in a downward direction and away from rotation motor 104 until hub/turntable combination 102 is located about distance $\Delta_0$ from rotation motor 104 in order to clear a path for insertion of the optical disc 110 into the ODD 100 by way of OD slot 402. In FIG. 8, hub/turntable combination 102 can pivot in an opposite direction than that shown in FIG. 7 reducing the distance between hub/turntable combination 102 and rotation motor 104 by about distance $\Delta_1$. In this way, hub 202 is forced into the center hole 502 of optical disc 110. In FIG. 9, hub/turntable combination 102 can further pivot about distance $\Delta_2$ (it should be noted that $\Delta_0 \approx \Delta_2 + \Delta_1$) with the now mounted optical disc 110 to a position that allows free rotation of optical disc/hub/turntable combination as well as brings turntable 204 into direct contact with driving rim 902 of rotation motor 104 which is fixed to chassis 101 of ODD 100.

Figure 10:
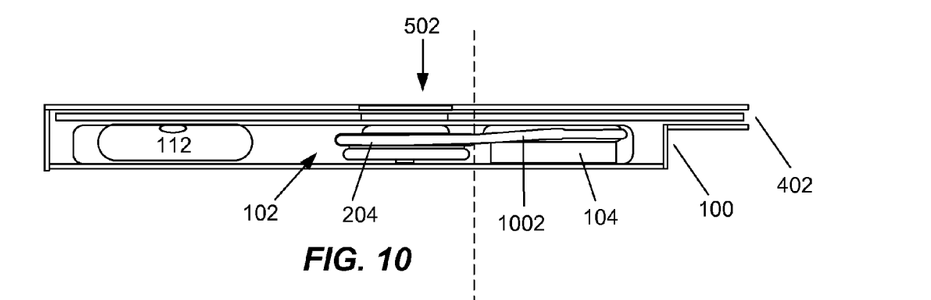
FIGS. 10-12 describe an embodiment in which the turntable/hub combination moves substantially along the z axis while the turntable it linked to the fixed rotation motor via a belt.
Figure 11:
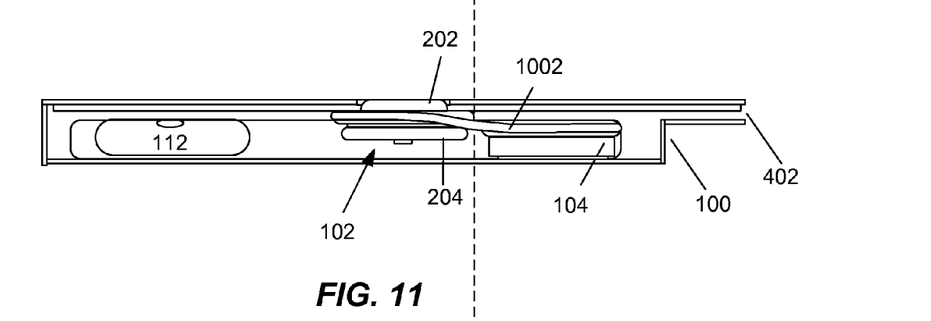
Figure 12:
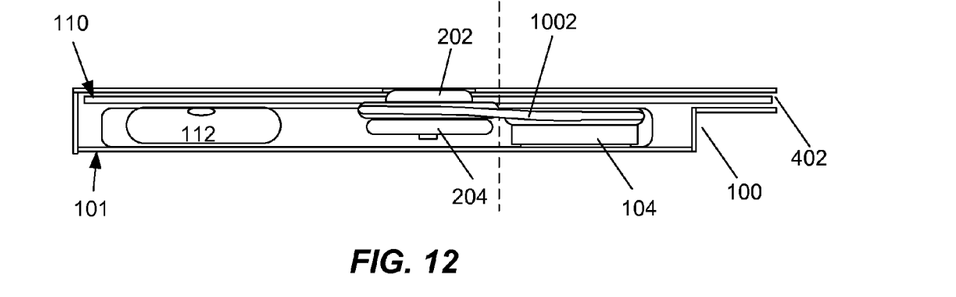

In FIG. 10, hub/turntable combination 102 moves in the downward direction to allow insertion of optical disc 110 into ODD 100 by way of OD slot 402. Rotation motor 104 can be linked via belt 1002 to turntable 204. In the described embodiment, belt 1002 can flex to accommodate the z axis motion of hub/turntable combination 102. In FIG. 11, hub/turntable combination 102 can move in the upward direction to force hub 202 into the center hole 502 of optical disc 110. In FIG. 12 hub/turntable combination 102 moves with mounted optical disc 110 to a position which allows free rotation. At this point, rotation motor 104 applies a motive force to belt 1002 that is, in turn, transferred to turntable 204 causing the hub/turntable/optical disc combination to rotate in an appropriate manner.

Figure 13:
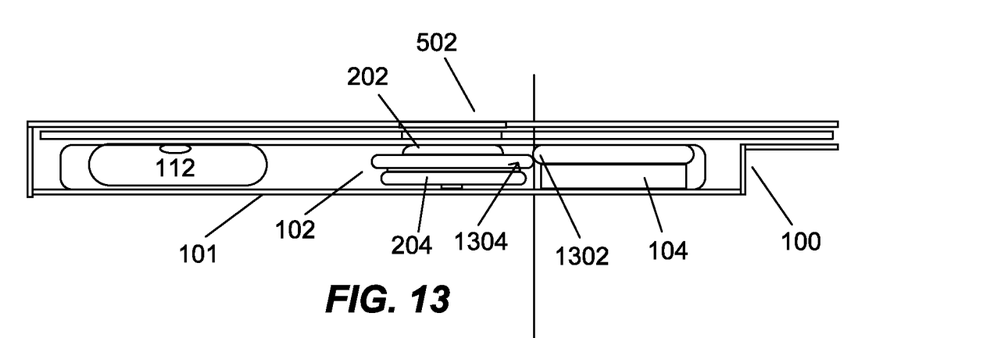
Figure 14:
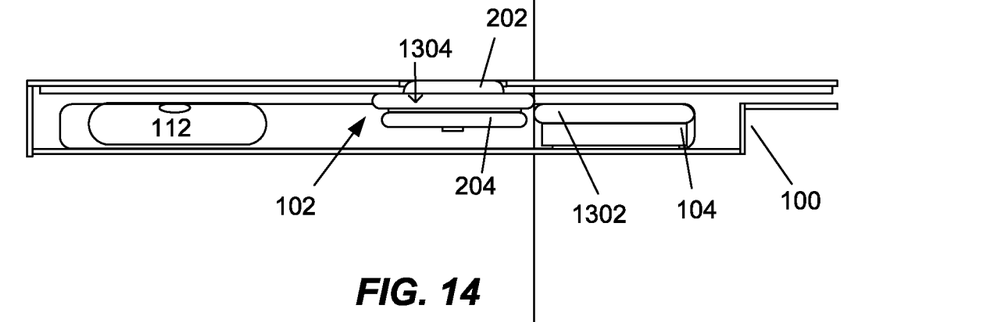
Figure 15:
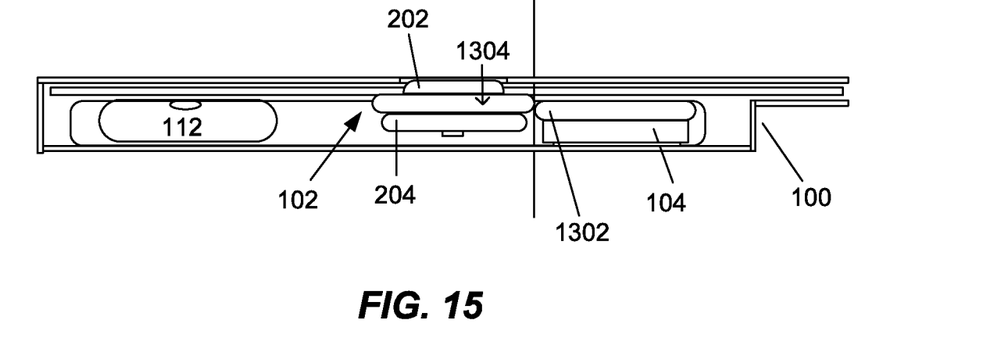

FIGS. 13-15 describe an embodiment in which turntable/hub combination 102 moves substantially along the z axis while rotational motor 104 remains fixed with respect to the ODD chassis 101. In FIG. 13, hub/turntable combination 102 can be moved in the downward z direction to allow insertion of the optical disc 110 into ODD 100 by way of OD slot 402. Rotation motor 104 can be linked to turntable 204 via surface contact where such surfaces 1302 and 1304 can be arranged to function as, for example, gears or their equivalent in that surfaces 1302 and 1304 facilitate sliding motion in the z direction. In this way, as shown in FIG. 14, hub/turntable combination 102 can move in the upward z direction to force hub 202 into the center hole 502 of the optical disc 110. In FIG. 15, hub/turntable combination 102 can move with the now mounted optical disc 110 to a position which allows free rotation. Moreover, surfaces 1302 and 1304 can be engaged in such a way that rotation motor 104 can impart a motive force directly to turntable 202 by way of the interaction between surfaces 1302 and 1304. It should be noted that the motive force can be transferred from by contact between surfaces 1302 and 1304 formed from the existence of a high coefficient of friction between the two surfaces such that the surfaces remain in contact during the rotation of the hub/turntable arrangement. In other embodiments, the motive force can be transferred by male and female gear shaped contact surfaces.

The described embodiments can also be embodied as computer readable code on a computer readable medium for controlling manufacturing operations or as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A reduced stack height slot loading optical disc drive (ODD), the stack height defined in a direction substantially perpendicular to the optical disc, the ODD comprising:
    a hub/turntable arrangement having a hub portion and a turntable portion, the turntable portion arranged to support an optical disc secured thereto by way of the hub such that when a rotational motive force is applied to the hub/turntable arrangement, the optical disc rotates about a hub/turntable axis of rotation; and
    a rotational motor adjacent to the hub/turntable arrangement, the rotational motor having a rotation axis being arranged to provide the rotational motive force to the hub/turntable arrangement, wherein a height of the hub/turntable arrangement and a height of the rotational motor are not concatenated, wherein
    the hub/turntable arrangement is coupled to the chassis of the ODD through a displacement mechanism such that the hub/turntable arrangement can be displaced to positions away from the chassis allowing for the insertion and chucking of optical discs.

2. The ODD as recited in claim 1, wherein the rotational motive force that is generated along the rotation axis of the rotational motor is translated in a direction that is substantially perpendicular to the hub/turntable axis of rotation.

3. The ODD as recited in claim 1, wherein an overall height of the optical disc drive is reduced by an amount equal to an nominal height of the rotational motor.

4. The ODD as recited in claim 1, wherein the displacement mechanism includes a spring drive force that raises and lowers the hub/turntable arrangement substantially linearly along the direction of the hub/turntable axis of rotation.

5. The ODD as recited in claim 1, wherein the rotational motor is coupled to the ODD chassis through a movable mechanism such that the rotational motor can move substantially linearly along the chassis in a direction that is perpendicular to the hub/turntable axis of rotation.

6. The ODD as recited in claim 1, wherein the displacement mechanism includes a pivoting structure that allows for the displacement of the hub/turntable arrangement in two dimensions along a plane that is substantially perpendicular to the bottom of the chassis.

7. The ODD as recited in claim 1, wherein the rotational motor is coupled to the ODD chassis in a fixed manner.

8. The ODD as recited in claim 7, wherein a portion of the periphery of the hub/turntable arrangement surface contacts a portion of the surface of the driving rim of the rotational motor creating a mating contact that restricts displacement of the hub/turntable substantially along the direction of hub/turntable rotational axis while the hub/turntable arrangement is rotating.

9. The ODD as recited in claim 8, wherein the mating contact is formed from the existence of a high coefficient of friction between the two surfaces such that the surfaces remain in contact during the rotation of the hub/turntable arrangement.

10. The ODD as recited in claim 8, wherein the mating contact is formed by male and female gear shaped contact surfaces.

11. The ODD as recited in claim 1, further comprising a belt that couples the rotational motor to the hub/turntable arrangement, wherein the flex of the belt provides the necessary drive force to displace the hub/turntable arrangement substantially linearly along the direction of the hub/turntable axis of rotation.

12. A method of mounting and rotating an optical disc on the hub/turntable arrangement of an optical disc drive (ODDS comprising the steps of:
    securing the optical disc to the hub/turntable arrangement;
    operationally configuring the hub/turntable arrangement with a rotation motor that is adjacent to and does not share the same axis of rotation as the hub/turntable arrangement; and,
    driving the rotation movement of the hub/turntable arrangement using the adjacent rotation motor, wherein securing the optical disc to the hub/turntable arrangement further comprises the steps of:
        displacing the hub/turntable arrangement in a substantially downward direction to provide a clear path of insertion of the optical disc, and
        displacing the hub/turntable arrangement in a substantially upward direction such that the hub extends through a central hole of the optical disc, securing the optical disc to the turntable.

13. The method of claim 12, wherein the hub/turntable arrangement is displaced substantially linearly along the direction of the hub/turntable axis of rotation.

14. The method of claim 12, wherein the hub/turntable arrangement is displaced in a two dimensional direction through the pivoting motion of the hub/turntable arrangement.

15. The method of claim 12, wherein operationally configuring the hub/turntable arrangement with the rotation motor includes displacing the hub/turntable arrangement such that the driving rim of the rotational motor is in contact with a portion of the periphery of the hub/turntable arrangement.

16. The method of claim 15, wherein the hub/turntable arrangement is displaced substantially linearly along the direction of the hub/turntable arrangement axis of rotation.

17. The method of claim 15, wherein the hub/turntable is displaced in a two dimensional direction through the pivoting motion of the hub/turntable.

18. The method of claim 15, wherein operationally configuring the hub/turntable arrangement with the rotation motor further includes the step of displacing the rotational motor along the chassis such that the driving rim of the rotational motor is in contact with a portion of the periphery of the hub/turntable arrangement.

19. A drive for reading and writing data into and from an optical disc with a portable computer device, the drive comprising:
    a motor for rotating the optical disc;
    a hub for supporting the optical disc;
    a means for coupling the motor to the hub along a plane substantially parallel to the plane of the optical disc; and
    a means for displacing the hub along a direction substantially perpendicular to the plane of the optical disc to allow the optical disc to be placed on the hub.

20. The drive of claim 19, wherein the means for coupling the motor to the hub comprise at least one selected from the group consisting of two high friction surfaces in motive contact with one another, a belt, and a gear.

* * * * *

UNITED STATES PATENT AND TRADEMARK OFFICE
CERTIFICATE OF CORRECTION

PATENT NO. : 8,650,584 B2  
APPLICATION NO. : 12/841902  
DATED : February 11, 2014  
INVENTOR(S) : Wehrenberg et al.

Page 1 of 1

It is certified that error appears in the above-identified patent and that said Letters Patent is hereby corrected as shown below:

In the Claims:

Column 7, claim 12, line 28, currently reads: "the hub/turntable arrangement of an optical disc drive (ODDS"

Column 7, claim 12, line 28, should read: "the hub/turntable arrangement of an optical disc drive (ODD)"

Signed and Sealed this  
Twenty-second Day of April, 2014

Michelle K. Lee  
*Deputy Director of the United States Patent and Trademark Office*